United States Patent
Haraguchi et al.

(10) Patent No.: US 11,204,414 B2
(45) Date of Patent: Dec. 21, 2021

(54) LASER RADAR DEVICE

(71) Applicant: Mitsubishi Electric Corporation, Tokyo (JP)

(72) Inventors: Eisuke Haraguchi, Tokyo (JP); Toshiyuki Ando, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 336 days.

(21) Appl. No.: 16/341,345

(22) PCT Filed: Nov. 2, 2016

(86) PCT No.: PCT/JP2016/082555
§ 371 (c)(1),
(2) Date: Apr. 11, 2019

(87) PCT Pub. No.: WO2018/083749
PCT Pub. Date: May 11, 2018

(65) Prior Publication Data
US 2020/0049804 A1    Feb. 13, 2020

(51) Int. Cl.
*G01C 3/08* (2006.01)
*G01S 7/4911* (2020.01)
(Continued)

(52) U.S. Cl.
CPC ............. *G01S 7/4911* (2013.01); *G01S 17/34* (2020.01); *G01S 17/95* (2013.01)

(58) Field of Classification Search
CPC ........ G01S 7/4911; G01S 7/484; G01S 17/34; G01S 17/32; G01S 17/95
(Continued)

(56) References Cited

U.S. PATENT DOCUMENTS 5,691,987 A    11/1997  Friederichs
6,580,497 B1    6/2003  Asaka et al.
(Continued)

FOREIGN PATENT DOCUMENTS

JP        2014-215157 A    11/2014
WO    WO 2006/030502 A1    3/2006
(Continued)

OTHER PUBLICATIONS

European Office Acton dated Jul. 30, 2020 for Application No. 16 920 799.0.
(Continued)

*Primary Examiner* — Mark Hellner
(74) *Attorney, Agent, or Firm* — Birch, Stewart, Kolasch & Birch, LLP (57) ABSTRACT

A laser radar device includes: a wavelength-tunable light source; an optical branch coupler dividing light emitted by the wavelength-tunable light source into local and transmission light; an optical phase modulator applying, to the transmission or local light, frequency shifts for wavelength discrimination of different shift amounts corresponding to respective wavelengths of light emitted by the wavelength-tunable light source; a wavelength separator switching between light paths for output, in response to wavelength of transmission light; an optical antenna emitting into space transmission light output by the wavelength separator, and receiving, as received light, backward-scattered light generated from transmission light in space in which lines of sight corresponding to respective wavelengths of the transmission light are determined; an optical heterodyne receiver receiving local light and received light, and performing heterodyne detection; and a signal processor performing frequency analysis of the optical heterodyne receiver output signal.

10 Claims, 10 Drawing Sheets

(51) Int. Cl.
*G01S 17/34* (2020.01)
*G01S 17/95* (2006.01)

(58) Field of Classification Search
USPC .......................................... 356/5.01
See application file for complete search history.

(56) References Cited

U.S. PATENT DOCUMENTS

| | | | |
|---|---|---|---|
| 7,679,729 B2 | 3/2010 | Ando et al. | |
| 2007/0058156 A1 | 3/2007 | Ando et al. | |
| 2015/0071315 A1* | 3/2015 | Roos .................... | H01S 5/0683 |
| | | | 372/20 |
| 2016/0291135 A1 | 10/2016 | Ando et al. | |
| 2016/0291137 A1 | 10/2016 | Sakimura et al. | |

FOREIGN PATENT DOCUMENTS

| | | |
|---|---|---|
| WO | WO 2015/087564 A1 | 6/2015 |
| WO | WO 2015/087842 A1 | 6/2015 |

OTHER PUBLICATIONS

European Office Action dated Oct. 26, 2020 for Application No. 16 920 799.0.
International Search Report, issued in PCT/JP2016/082555, PCT/ISA/210, dated Dec. 13, 2016.

* cited by examiner

LASER RADAR DEVICE

BACKGROUND OF THE INVENTION

Technical Field

The present invention relates to a laser radar device.

Background Art

The Patent Literature, WO 2015/087842, as listed below discloses a technique to separate laser light beams with different wavelengths on a wavelength-by-wavelength basis and perform switching between lines of sight in an optical-fiber wind measurement lidar. According to this technique, synchronization is performed between a line-of-sight switching signal and measurement data for each line of sight to obtain wind direction and velocity data.

CITATION LIST

Patent Literature

PCT International Application Publication No. WO 2015/087842.

BRIEF SUMMARY OF THE INVENTION

Technical Problem

However, there is no technique to determine the line of sight in a case where a communication error occurs at switching between lines of sight or where an error in synchronization detection occurs. It is then difficult to determine the line of sight from measurement data.

The present invention has been made to solve the above described problem, and an object of the present invention is to make it possible to bring measurement data into correspondence with lines of sight by applying, to pulsed transmission light of an laser radar device, different frequency shifts corresponding to their respective lines of sight, and assigning the different frequency shifts to their respective lines of sight, and to improve the reliability of a wind measurement lidar.

Solution to Problem

A laser radar device according to the present invention includes: a wavelength-tunable light source configured to emit light with a plurality of wavelengths; an optical branch coupler configured to divide the light emitted by the wavelength-tunable light source into local light and transmission light; an optical phase modulator configured to apply, to the transmission light or the local light, frequency shifts for wavelength discrimination of different shift amounts corresponding to the respective wavelengths of the light emitted by the wavelength-tunable light source; a wavelength separator configured to perform switching between light paths for output, in response to a wavelength of the transmission light; an optical antenna configured to emit into space the transmission light output by the wavelength separator, and configured to receive, as received light, backward-scattered light generated from transmission light in space in which lines of sight corresponding to the respective wavelengths of the transmission light are determined; an optical heterodyne receiver configured to receive the local light and the received light, and configured to perform heterodyne detection; and a signal processor configured to perform frequency analysis of an output signal of the optical heterodyne receiver.

Advantageous Effects of Invention

According to the present invention, it is possible to determine the line of sight from measurement data.

DETAILED DESCRIPTION OF EMBODIMENTS

First Embodiment

Figure 1:
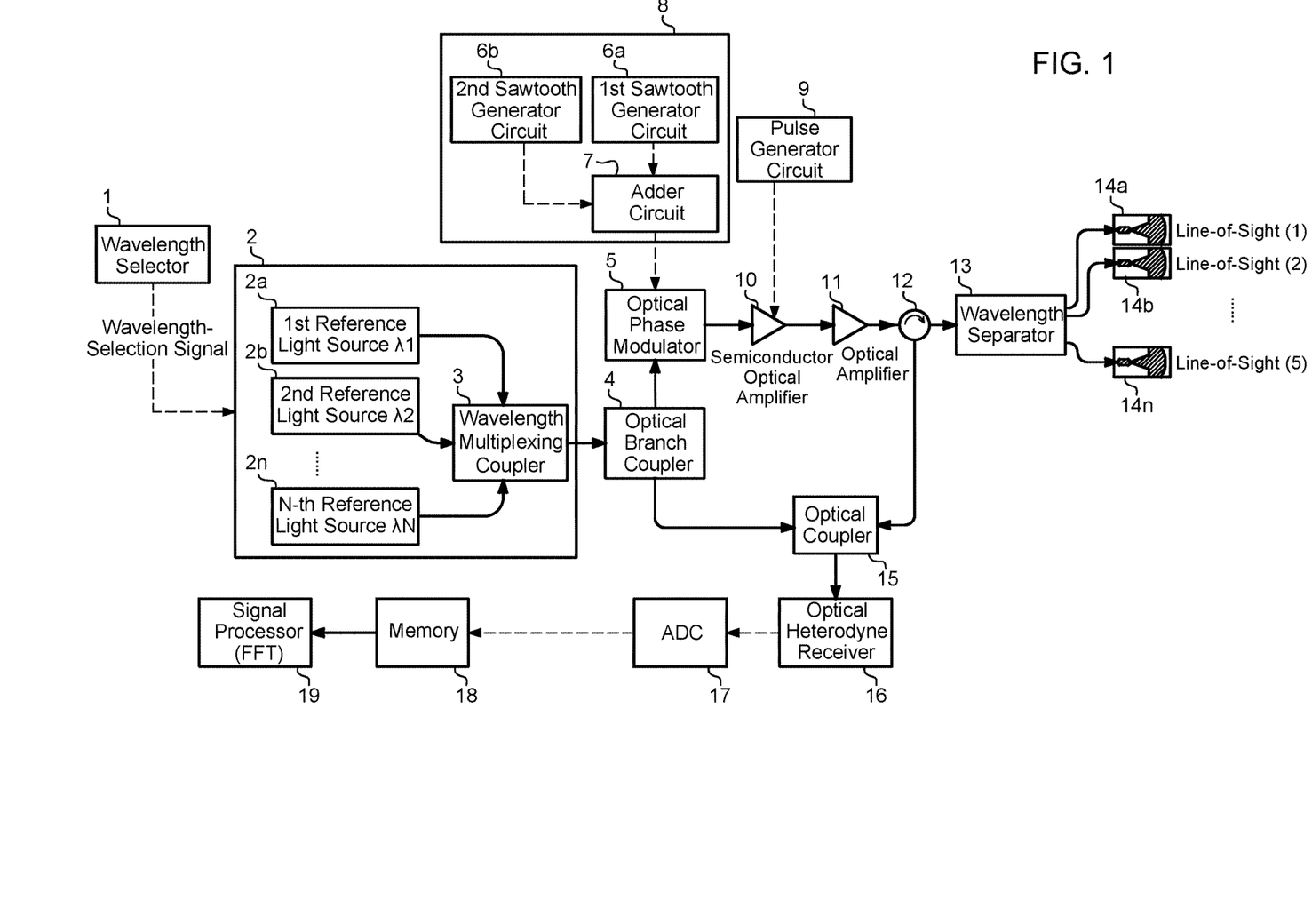
FIG. 1 is a configuration diagram showing an example configuration of a laser radar device according to a first embodiment of the present invention.

FIG. 1 is a configuration diagram showing an example configuration of a laser radar device according to a first embodiment of the present invention. In FIG. 1, arrows with solid lines indicate transmission paths of optical signals, and arrows with dashed lines indicate transmission paths of electrical signals.

The laser radar device includes a wavelength selector 1, a wavelength-tunable light source 2, an optical branch coupler 4, an optical phase modulator 5, a time-division sawtooth generator circuit 8, a pulse generator circuit 9, a semiconductor optical amplifier 10, an optical amplifier 11, a polarization-maintaining optical circulator 12, a wavelength separator 13, a first optical antenna 14a, a second optical antenna 14b, an N-th optical antenna 14n, an optical coupler 15, an optical heterodyne receiver 16, an analog-to-digital (AD) converter 17, a memory 18, and a signal processor 19.

The wavelength selector 1 is a wavelength selector that outputs a wavelength-selection signal indicating an emission wavelength to the wavelength-tunable light source 2. The wavelength selector 1 is connected to the wavelength-tunable light source 2, and controls the wavelength of light to be emitted from the wavelength-tunable light source 2. For example, as the wavelength selector 1, devices such as a personal computer (PC), microcomputer, and/or switch are used. The wavelength-tunable light source 2 is controlled by commands supplied from a PC to control the emission wavelength of the wavelength-tunable light source. Further, when performing switching between wavelengths, the wavelength selector 1 may control the operating point of a parameter such as the temperature or injection current of the wavelength-tunable light source 2 thereby to perform switching between emission wavelengths of the wavelength-tunable light source 2.

The wavelength-tunable light source 2 is a wavelength-tunable light source configured to emit light with the wavelength selected in accordance with the wavelength-selection signal of the wavelength selector 1. The wavelength-tunable light source 2 includes a first reference light source 2a, a second reference light source 2b, an N-th reference light source 2N, and a wavelength multiplexing coupler 3. Each of the first reference light source 2a, the second reference light source 2b, and the N-th reference light source 2N is a light source configured to emit single-wavelength light as a carrier. The wavelength selector 1 selects one reference light source from among the first through the N-th reference light sources, and the selected reference light source generates light. The wavelength multiplexing coupler 3 is a coupler configured to multiplex light waves in the light paths of the respective reference light sources. The wavelength multiplexing coupler 3 emits light obtained by multiplexing light waves, to the optical branch coupler 4.

The optical branch coupler 4 is a coupler configured to split an output light path into a local light path and a transmission light path. The optical branch coupler 4 divides the light emitted from the wavelength-tunable light source 2 into local light and transmission light, outputs the local light to the optical coupler 15, and outputs the transmission light to the optical phase modulator 5.

The optical phase modulator 5 is an optical phase modulator configured to modulate the phase of the transmission light in accordance with a sawtooth signal output from the time-division sawtooth generator circuit 8, thereby to apply frequency shifts to the transmission light. For example, as the optical phase modulator 5, a modulator device such as an LN (LiNbO$_3$) phase modulator, a semiconductor optical modulator, or a silicon modulator is used.

The time-division sawtooth generator circuit 8 is a circuit configured to generate a sawtooth signal that controls the frequency shift of transmission light. The time-division sawtooth generator circuit 8 includes a first sawtooth generator circuit 6a, a second sawtooth generator circuit 6b, and an adder circuit 7. The first sawtooth generator circuit 6a and the second sawtooth generator circuit 6b are sawtooth generator circuits configured to generate sawtooth signals with different periods at different times respectively, and output the sawtooth signals to the adder circuit 7. The adder circuit 7 is an adder circuit configured to combine the sawtooth signals of the first sawtooth generator circuit 6a and the second sawtooth generator circuit 6b. The adder circuit 7 combines two different sawtooth signals that are separated in time domain, thereby to output one sawtooth signal.

The pulse generator circuit 9 is a pulse generator circuit configured to output a control signal to be used when the semiconductor optical amplifier 10 converts the transmission light into pulses. The control signal is a pulse signal, and the pulse period of transmission light are controlled by the pulse signal.

The semiconductor optical amplifier 10 is a semiconductor optical amplifier configured to amplify modulated transmission light and convert the modulated transmission light into pulses in accordance with the pulse signal output from the pulse generator circuit 9. For example, as the semiconductor optical amplifier, an InP/InGaAsP semiconductor optical amplifier is used.

The optical amplifier 11 is an amplifier configured to amplify pulsed transmission light, and outputs the resulting light to the polarization-maintaining optical circulator 12.

The polarization-maintaining optical circulator 12 is a circulator configured to separate the transmission light path and the received light path from each other. The polarization-maintaining optical circulator 12 outputs transmission light fed by the optical amplifier 11 to the wavelength separator 13, and outputs received light received by optical antennas to the optical coupler 15.

The wavelength separator 13 is a wavelength separator configured to separate light paths from one another in accordance with wavelengths, and output the resulting light to the optical antennas connected to the respective light paths. The wavelength separator 13 also combines the received light received by the optical antennas, and outputs the resulting light to the polarization-maintaining optical circulator 12. For example, as the wavelength separator 13, a dense wavelength division-multiplexing (DWDM) filter, a fiber Bragg grating (FBG) filter, or an arrayed-waveguide grating (AWG) filter is used.

The first optical antenna 14a, the second optical antenna 14b, and the N-th optical antenna 14n are optical antennas configured to transmit the transmission light, and receive scattered transmission light from aerosol as received light. Here, the lines of sight of the optical antennas have different directions corresponding to the respective wavelengths of transmission light.

The optical coupler 15 is a coupler configured to mix the local light output from the optical branch coupler 4 and the received light output from the polarization-maintaining optical circulator 12.

The optical heterodyne receiver 16 is a receiver configured to receive the light obtained by the mixing in the optical coupler 15, and perform heterodyne detection.

The AD converter 17 is an analog-to-digital converter configured to convert an analog signal obtained by the heterodyne detection in the optical heterodyne receiver 16, into a digital signal. The AD converter 17 divides a received signal that is a converted signal in a digital format, into segments in reception gate widths (i.e., temporal gate widths) each corresponding to the pulse width of transmission light, and outputs the resulting signals to the memory 18.

The memory 18 stores signals segmented in temporal gate widths.

The signal processor 19 is a signal processor configured to perform fast Fourier transform of the received signal for each reception gate, stored in the memory 18, and thereby calculate values such as a peak value, spectrum width, and signal-to-noise ratio (SNR) of a power spectrum for each reception gate. For example, as the signal processor 19, a field programmable gate array (FPGA), an application specific integrated circuit (ASIC), or a microcomputer is used.

Next, operations of the laser radar device according to the first embodiment of the present invention will be described.

The wavelength selector 1 outputs, to the wavelength-tunable light source 2, a selection signal for selecting a reference light source from among the first through N-th reference light sources. The wavelength-tunable light source 2 selects a reference light source in accordance with a wavelength-selection signal, and emit light of the selected reference light source.

The optical branch coupler 4 divides the light emitted by the wavelength-tunable light source 2, into local light and transmission light, outputs the local light to the optical coupler 15, and outputs the transmission light to the optical phase modulator 5.

In the time-division sawtooth generator circuit 8, the adder circuit 7 combines a first sawtooth signal output by the first sawtooth generator circuit with a second sawtooth signal output by the second sawtooth generator circuit, and outputs the resulting sawtooth signal to the optical phase modulator 5. The first sawtooth signal and the second sawtooth signal have different periods and are separated from each other in time domain.

Figure 2:
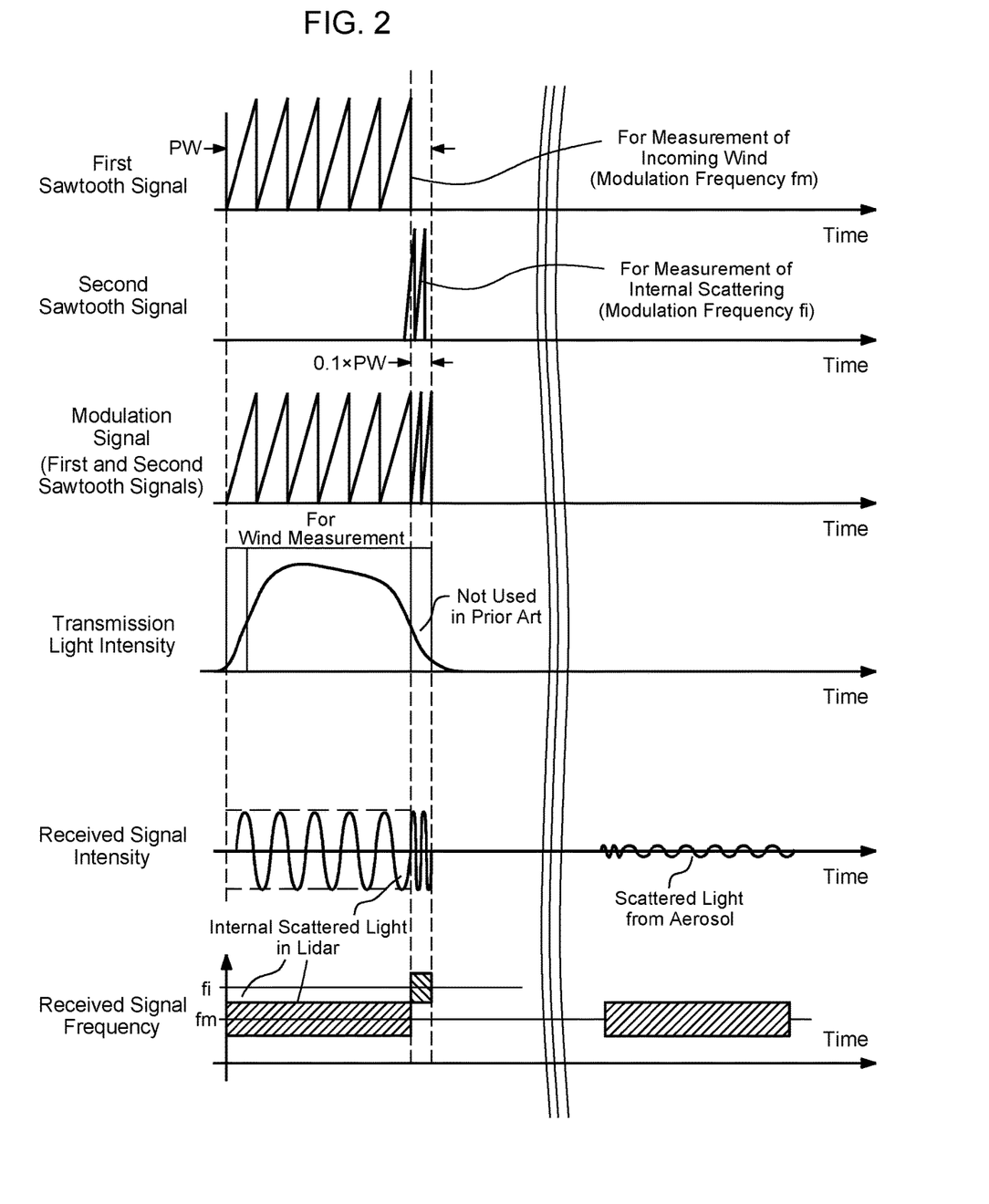
FIG. 2 illustrates a schematic of modulation signals according to the first embodiment of the present invention.

FIG. 2 illustrates a schematic of modulation signals according to the first embodiment of the present invention. In FIG. 2, the sawtooth signal obtained by the combining is a signal comprised of two kinds of sawtooth signals: a first sawtooth signal appearing in the time period from "0" to "0.9 PW", and a second sawtooth signal appearing in the time period from "0.9 PW" to "PW", where "PW" indicates a pulse width. Because the second sawtooth signal has the period that varies depending on the wavelength of transmission light, frequency shift amounts of transmission light in the optical phase modulator 5 are different as will be described later. In this case, the second sawtooth signal is present at the trailing or falling edge of a pulse. Instead, the second sawtooth signal may be present at the rising edge of the pulse.

In accordance with the sawtooth signal output from the time-division sawtooth generator circuit 8, the optical phase modulator 5 modulates the phase of transmission light thereby to apply frequency shifts to the transmission light. A relationship between a phase change and a frequency shift is as shown in the mathematical expression below, where f represents a frequency, and φ represents a phase.

[Mathematical Expression 1]

$$\Delta f = \frac{d\phi}{dt} \quad (1)$$

Here, the relationship between the phase φ and the period T of sawtooth waves is as follows.

[Mathematical Expression 2]

$$\phi = 2\pi \times \frac{1}{T} \quad (2)$$

As can be seen from FIG. 2, the modulation frequency of transmission light in the region for the first sawtooth signal is denoted by fm, and the modulation frequency of transmission light in the region for the second sawtooth signal is denoted by fi. In this manner, in accordance with the sawtooth signal output from the time-division sawtooth generator circuit 8, the optical phase modulator 5 changes the burst linear phase modulation frequency of the falling portion of the pulse, corresponding to the wavelength.

The semiconductor optical amplifier 10 amplifies and converts modulated transmission light into pulses, in accordance with the pulse signal output from the pulse generator circuit 9.

The optical amplifier 11 amplifies the pulsed transmission light thereby to output amplified transmission light to the polarization-maintaining optical circulator 12.

The polarization-maintaining optical circulator 12 outputs transmission light fed by the optical amplifier 11, to the wavelength separator 13.

The wavelength separator 13 determines a light path of transmission light in accordance with the wavelength of light, and outputs light to the optical antenna corresponding to the determined light path. Here, part of the transmission light is possibly scattered at the end of the optical antenna, and is converted into internal scattered light. The internal scattered light is output to the polarization-maintaining optical circulator 12.

The first optical antenna 14a, the second optical antenna 14b, or the N-th optical antenna 14n emits transmission light into space. Those optical antennas have predetermined lines of sight, and thus have different directions of emission corresponding to wavelengths of transmission light.

Figure 3:
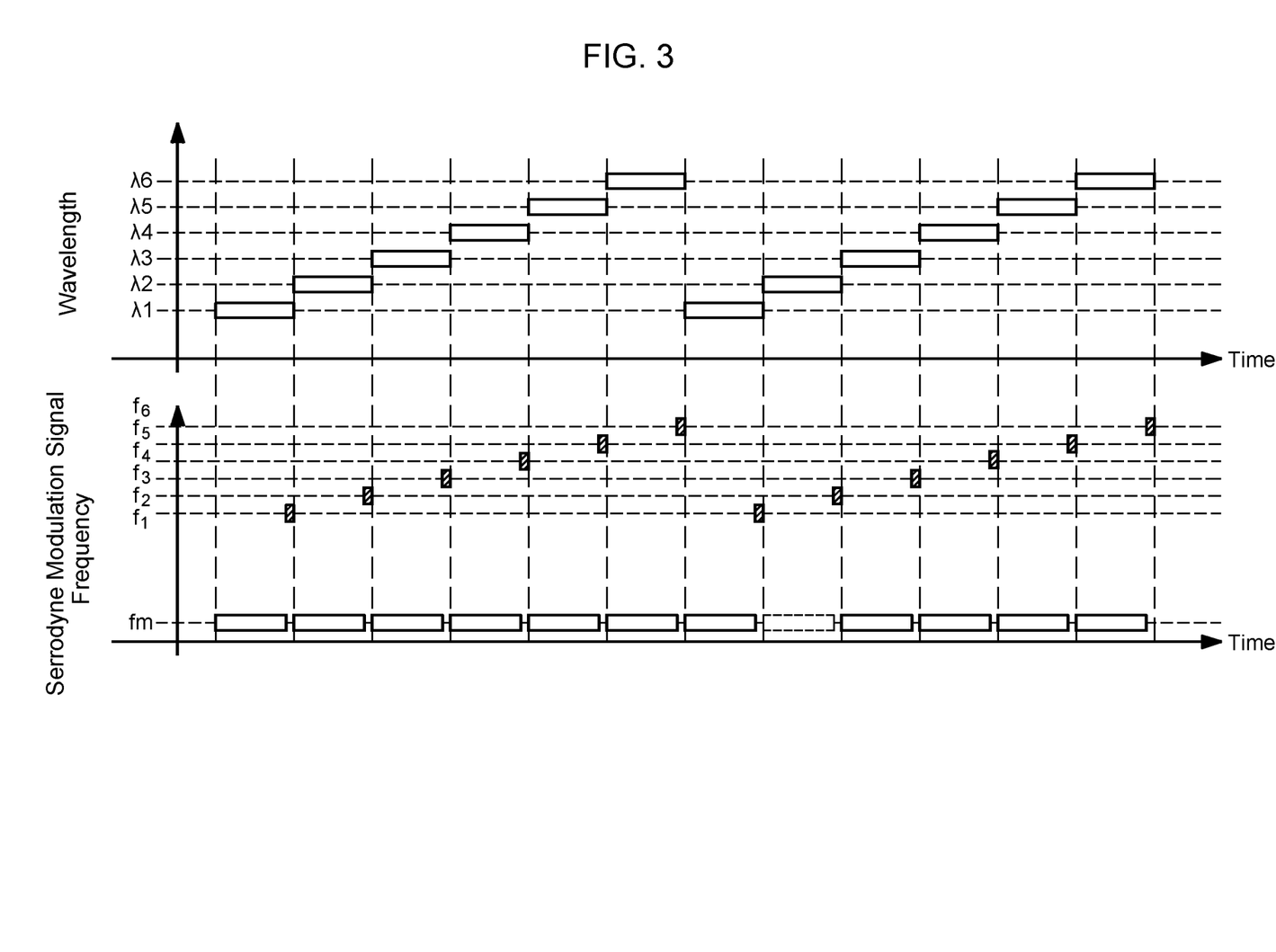
FIG. 3 is a diagram showing the relationship between the wavelength of transmission light and a serrodyne modulation signal frequency according to the first embodiment of the present invention.

FIG. 3 is a diagram showing the relationship between the transmission light wavelength and the serrodyne modulation signal frequency, according to the first embodiment of the present invention. The serrodyne modulation signal frequency refers to the frequency shift amount that is generated by optical phase modulation using a sawtooth signal. The wavelength changes with time, and the serrodyne modulation signal frequencies corresponding to the respective wavelengths are different in the falling regions of pulses. Here, fm corresponds to the frequency shift amount (a frequency shift for modulation) applied by the first sawtooth signal, and f1, . . . , and f6 correspond to the frequency shift amounts (frequency shifts for wavelength discrimination) applied by the second sawtooth signals. As the serrodyne modulation signal frequencies f1, . . . , and f6 correspond to wavelengths λ1, . . . , and λ6, the lines of sight can be determined by discrimination between frequencies f1, . . . , and f6.

The light emitted into space is backward scattered by a scattering object (e.g., aerosol moving at the same velocity as the wind velocity) in an observation space in each of the lines of sight, and is affected by Doppler frequency shift depending on the moving velocity of the scattering object. The optical antenna, after emission of the transmission light, receives the backward-scattered light as received light from the scattering object.

The polarization-maintaining optical circulator 12 outputs the received light to the optical coupler 15.

The optical coupler 15 combines local light with the received light, and outputs the resulting composite light to the optical heterodyne receiver 16. Likewise, the polarization-maintaining optical circulator 12 combines the local light with internal scattered light, and outputs the resulting composite light to the optical heterodyne receiver 16.

The optical heterodyne receiver 16 performs heterodyne detection on the composite light, and outputs the resulting detection signal to the AD converter 17. The center frequency of the power spectrum of the detection signal is equal to the sum of the frequency shift amount applied by the first sawtooth signal and the amount of the Doppler frequency shift.

The AD converter 17 converts the received signal into a digital signal at a prescribed sampling rate. The received signal obtained by the conversion is divided into segments in reception gate widths (i.e., temporal gate widths) each corresponding to the pulse width of transmission light, for output to the memory 18. The memory 18 stores signals segmented in temporal gate widths.

Figure 4:
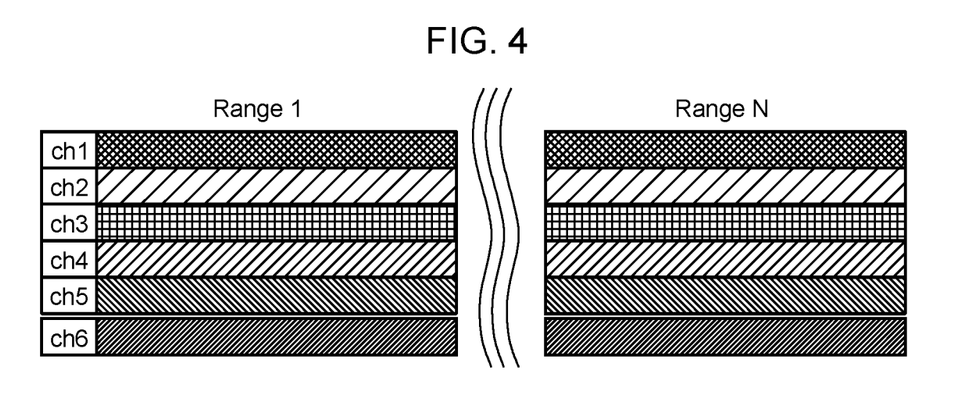
FIG. 4 illustrates a schematic of the signals stored in a memory according to the first embodiment of the present invention.

FIG. 4 illustrates a schematic of signals stored in the memory according to the first embodiment of the present invention. In this Figure, ch1 through ch5 correspond to lines-of-sight (1) through (5).

The signal processor 19 performs fast Fourier transform of the signal for each temporal gate, stored in the memory 18, to calculate the peak value, spectrum width, and SNR of the power spectrum.

Figure 5:
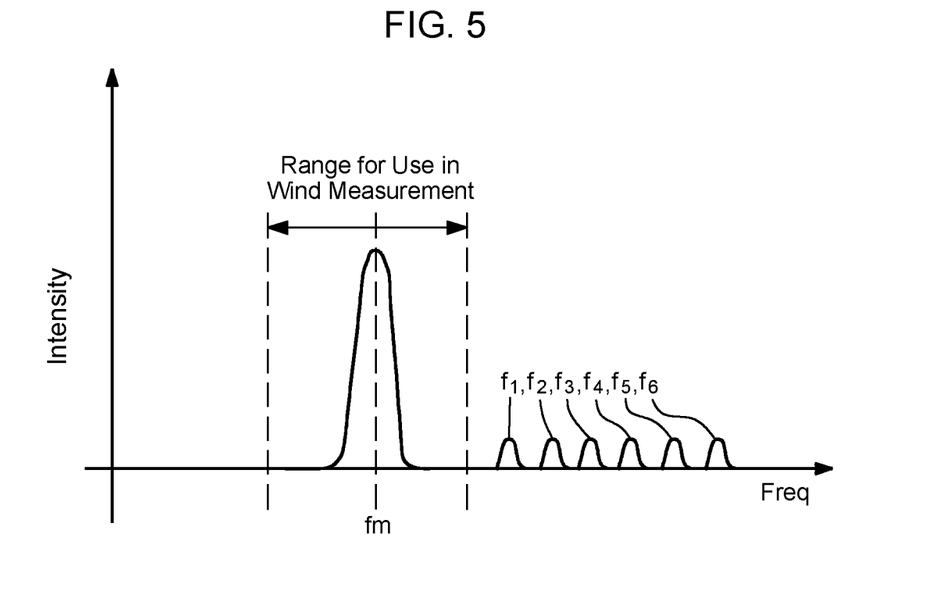
FIG. 5 illustrates a schematic of the power spectrum according to the first embodiment of the present invention.

FIG. 5 illustrates a schematic of a power spectrum according to the first embodiment of the present invention. In this figure, a range centered at the frequency fm is used for wind measurement and frequencies f1, . . . , and f6 exist in a frequency band that is not used for wind measurement. In addition, frequencies f1, . . . , and f6 exist in time periods that are not used for wind measurement, for measurement based on internal scattered light in the trailing portions of pulses. Since frequencies f1, . . . , and f6 correspond to the wavelengths λ1, . . . , and λ6 as described above, the lines of sight can be found by measurements of peaks appearing at frequencies f1, . . . , and f6. As shown in FIG. 5, the lines of sight can be found out from the measurement data in the frequency band and the time periods that are not used for wind measurement. In the above-described case, the lines of sight are calculated from the internal scattered light. Alternatively, the lines of sight may be calculated from received light.

As described above, according to the first embodiment, the frequency shift amounts of internal scattered light, which are not measured in conventional techniques, are measured, thereby making it possible to bring measurement data into correspondence with the lines of sight. This allows for contribution to improvement of the reliability of lidars. Further, where the present invention is used, it is not necessary to use the circuit that performs synchronization between a line-of-sight switching signal and a measurement signal. This allows for the simplification and downsizing of the lidars.

Note that the optical phase modulator used in the present embodiment achieves high-speed switching between modulation states by using the refractive index change of a light propagation path through electro-optic effect in lithium niobate (LN) crystals, and the switching between modulation frequencies within one pulse as described above cannot be implemented with an acousto-optical modulator.

Second Embodiment

In the burst linear phase modulation (sawtooth modulation) of the first embodiment, while modulation signals for wind measurement at the central portions of pulses are applied, modulation signals for intra-pulse measurement are applied to the falling portions of the pulses, and the modulation frequencies for the intra-pulse measurement are set to be different values corresponding to the lines of sight. Further, the data of internal scattered light is acquired to bring wind measurement data into correspondence with the lines of sight. In a second embodiment, on the other hand, a light path that does not output light into space is provided to check the relationship between a set wavelength and an emission wavelength.

Figure 6:
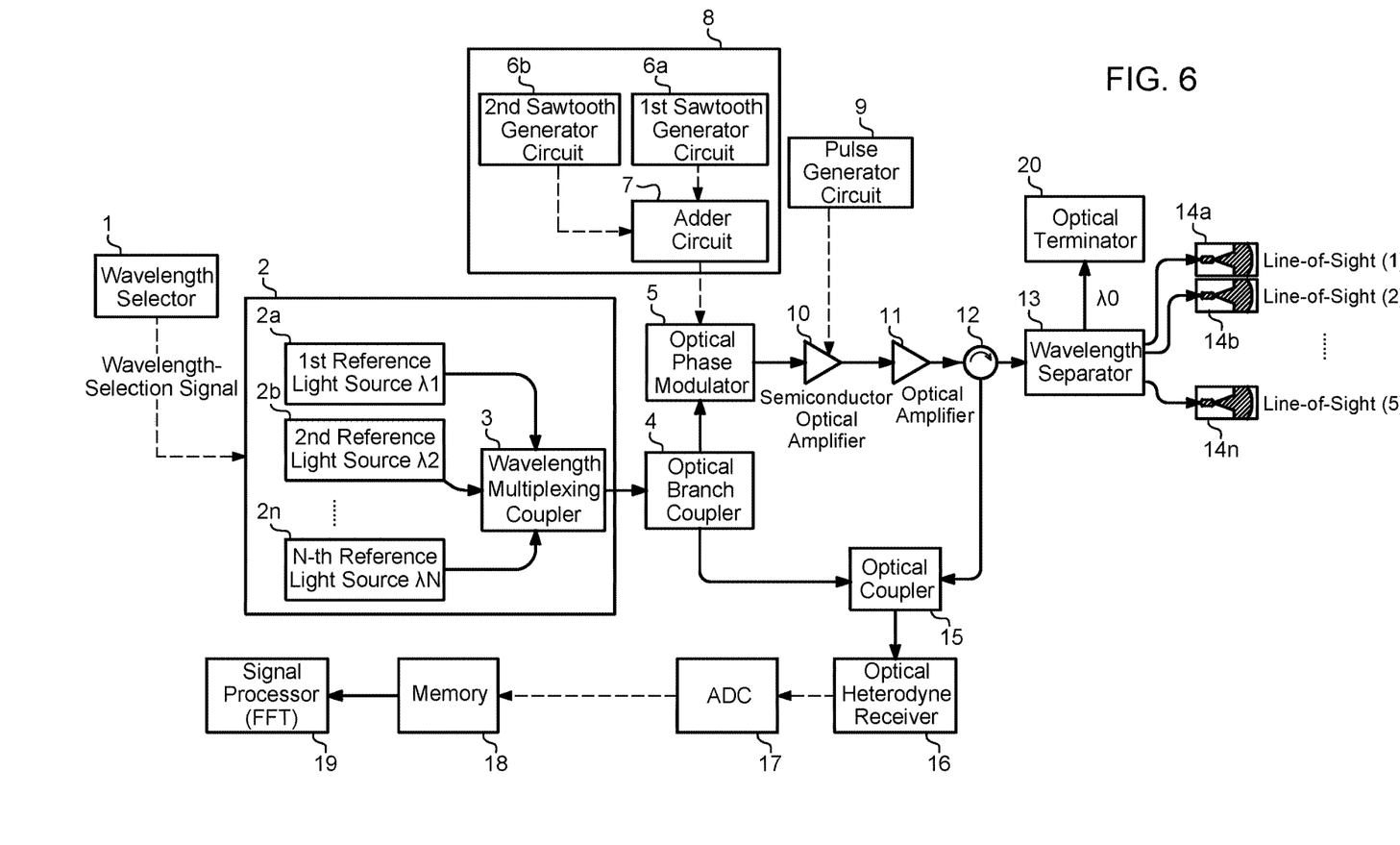
FIG. 6 is a configuration diagram showing an example configuration of a laser radar device according to a second embodiment of the present invention.

FIG. 6 is a configuration diagram showing an example configuration of a laser radar device according to the second embodiment of the present invention. In FIG. 6, the same reference numerals as those in FIG. 1 indicate the same or corresponding components, and therefore, their explanations will not be made. Further, in FIG. 6, arrows with solid lines indicate transmission paths of optical signals, and arrows with dashed lines indicate transmission paths of electrical signals. The difference from FIG. 1 is an optical terminator 20 that is connected to the wavelength separator 13.

The optical terminator 20 is an optical terminator configured to absorb transmission light output from the wavelength separator 13, and reduce light returning to the wavelength separator 13. For example, the optical terminator 20 may be an optical connector with an oblique cut, an optical terminator using a metal-doped optical fiber, or an optical attenuator.

Next, operations of the laser radar device according to the second embodiment of the present invention will be described. As operations performed until the light path of transmission light is separated by the wavelength separator 13 are the same as the operations of the first embodiment, explanations thereof will not be made.

When the wavelength of transmission light is λ0, the wavelength separator 13 outputs transmission light to the optical terminator 20, to provide a light path that does not output light into space. In this case, only the zeroth range can be measured.

Figure 7:
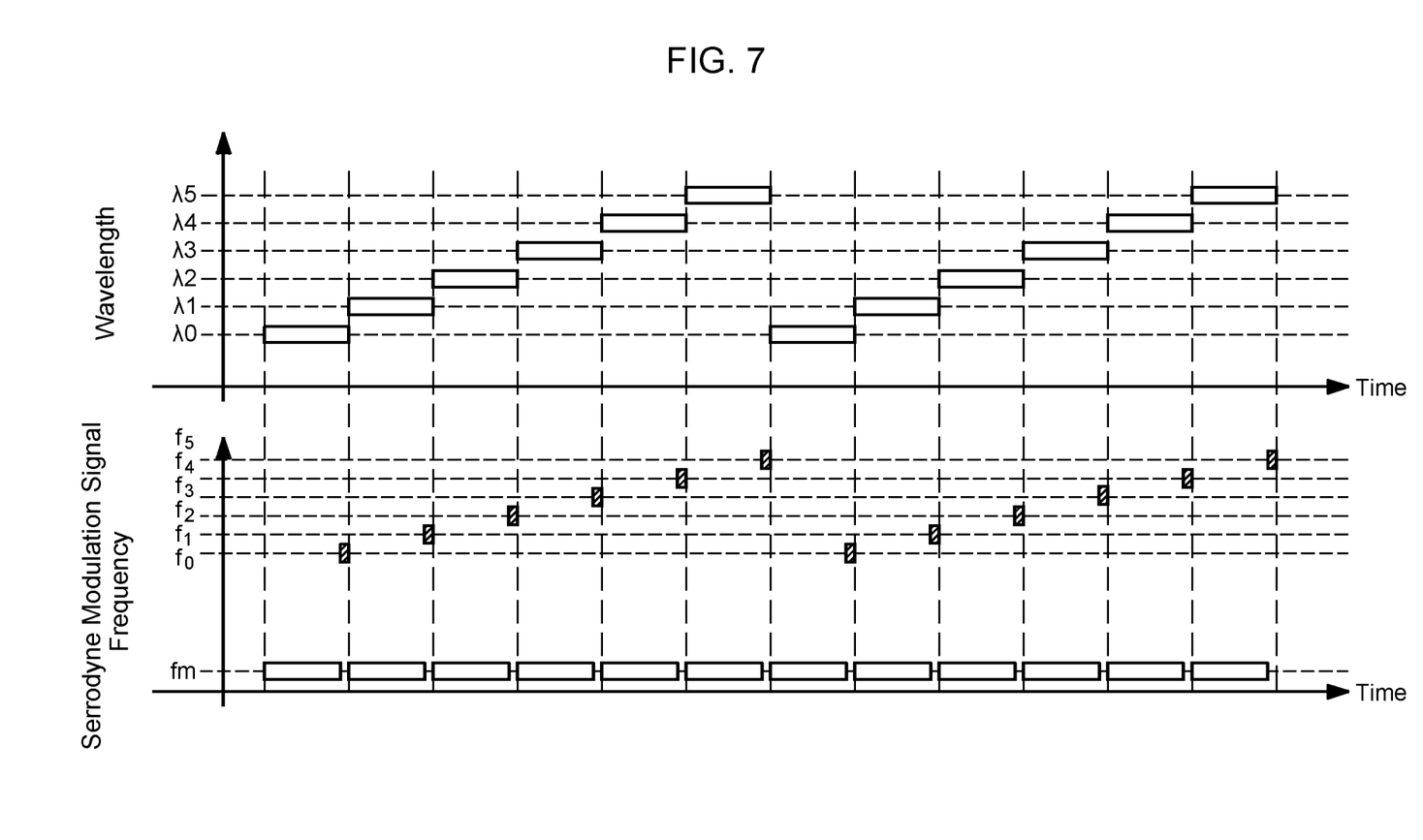
FIG. 7 is a diagram showing the relationship between the wavelength of transmission light and a serrodyne modulation signal frequency according to the second embodiment of the present invention.

FIG. 7 is a diagram showing the relationship between the wavelength of transmission light and a serrodyne modulation signal frequency according to the second embodiment of the present invention. As shown in FIG. 7, the lines of sight (wavelengths) are changed in the following sequence: λ0, λ1, . . . , λN, λ0, . . . . However, there is the possibility that, due to data corruption or the like of the wavelength-selection signal, the wavelength-selection signal is not properly applied to the wavelength-tunable light source, causing the changed wavelength to be different from the set value. In the laser radar device according to the second embodiment, it is possible to check whether the set wavelength matches the emission wavelength by comparing the setting information about λ0 with the result of the zeroth range measurement.

Figure 8:
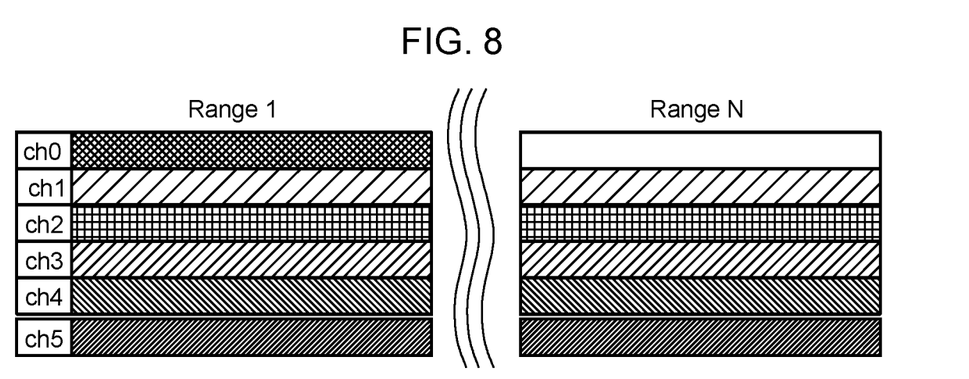
FIG. 8 illustrates a schematic of the signals stored in a memory according to the second embodiment of the present invention.

FIG. 8 illustrates a schematic of signals stored in the memory according to the second embodiment of the present invention. Here, the channel numbers correspond to the wavelength numbers. Specifically, ch0 corresponds to λ0, ch1 corresponds to λ1, and ch2 corresponds to λ2. In this case, only the zeroth range is measured on ch0. Accordingly, there exists data in Range 0, but there is no data in Range N. Therefore, when data pieces exit for ranges other than Range 0 on ch0, it is recognized that a difference exits between the sequence of set wavelengths and the sequence of emission wavelengths.

As described above, according to the second embodiment, when measurement is carried out by sequentially performing switching between wavelengths, transmission light with a predetermined wavelength is output to the optical terminator, and the measurement data with respect to the zeroth range is examined thereby to verify whether the sequence of set wavelengths matches the sequence of emission wavelengths.

Third Embodiment

In the burst linear phase modulation (sawtooth modulation) of the first embodiment, while modulation signals for wind measurement at the central portions of pulses are applied, modulation signals for intra-pulse measurement are applied to the falling portions of the pulses, and the modulation frequencies for the intra-pulse measurement are set to be different values corresponding to the lines of sight. Further, the data of internal scattered light is acquired to bring wind measurement data into correspondence with the lines of sight. In a third embodiment, on the other hand, burst linear phase modulation with a constant period is applied to transmission light, and frequency shifts with opposite characteristics to transmission light are applied to local light, so that both the rising and falling portions can be used in wind measurement.

Figure 9:
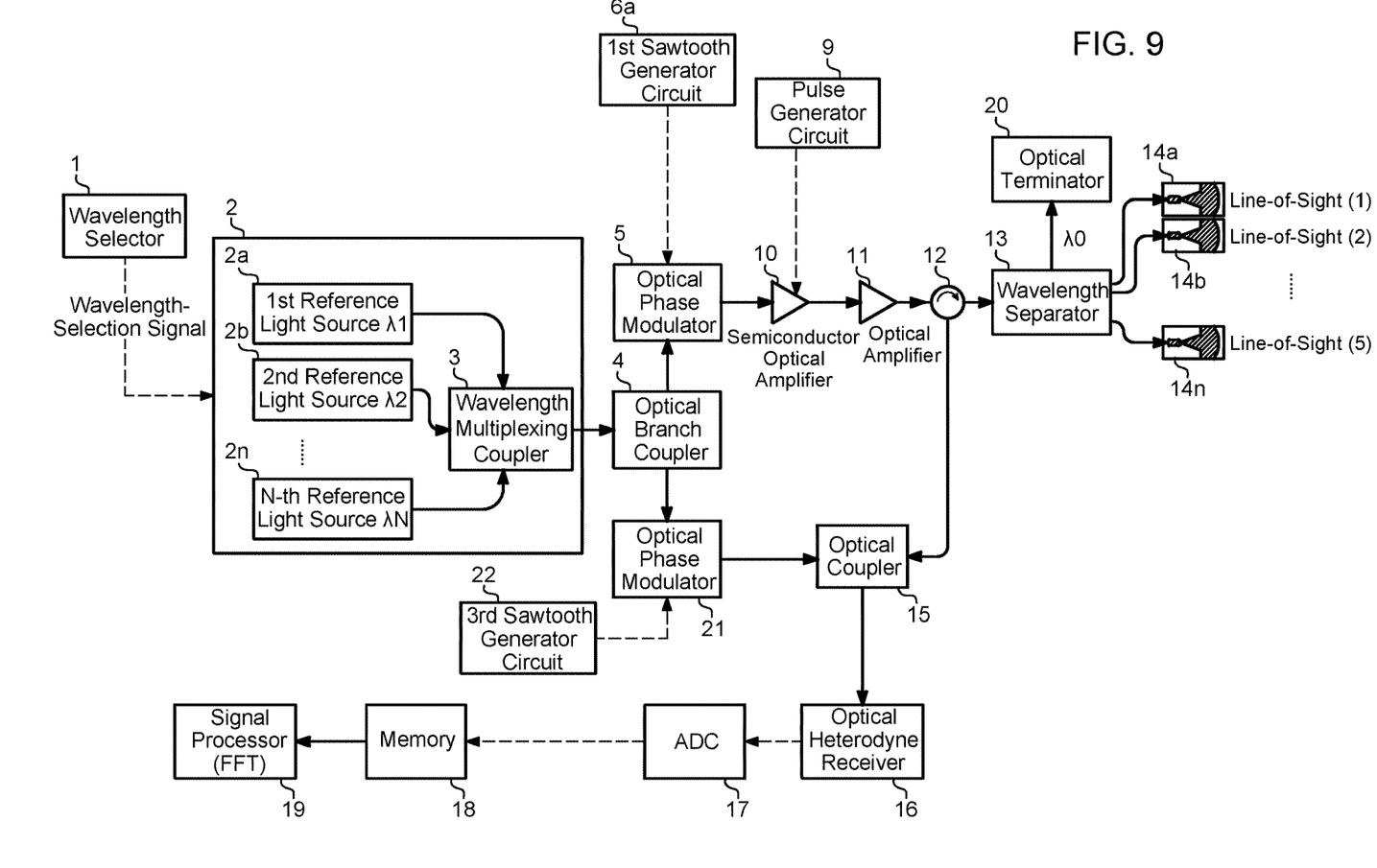
FIG. 9 is a configuration diagram showing an example configuration of a laser radar device according to a third embodiment of the present invention.

FIG. 9 is a configuration diagram showing an example configuration of a laser radar device according to the third embodiment of the present invention. In FIG. 9, the same reference numerals as those in FIG. 6 indicate the same or corresponding components, and therefore, their explanations will not be made. Further, in FIG. 9, arrows with solid lines indicate transmission paths of optical signals, and arrows with dashed lines indicate transmission paths of electrical signals. The differences from FIG. 6 are an optical phase modulator 21 and a third sawtooth generator circuit 22 which are provided in the light path of local light, and the first sawtooth generator circuit 6a that alone controls the optical phase modulator 5.

The optical phase modulator 21 (an example of an optical phase modulator) is an optical phase modulator configured to modulate the phase of local light obtained by the division in the optical branch coupler 4, in accordance with a sawtooth signal output from the third sawtooth generator circuit 22, to apply frequency shifts.

The third sawtooth generator circuit 22 is a sawtooth generator circuit configured to output, to the optical phase modulator 21, a third sawtooth signal that provides frequency shifts with the opposite characteristics to transmission light.

Next, operations of the laser radar device according to the third embodiment of the present invention will be described. Explanations of the same aspects of the operations as those of the first embodiment will be not made.

To the optical phase modulator 5 (an example of an second optical phase modulator) which is configured to modulate transmission light, a burst linear phase modulation signal is applied by the first sawtooth generator circuit 6a for a pulse width (modulation frequency: fm). To the optical phase modulator 21 newly provided in the local light path, on the other hand, sawtooth waves with a frequency (fi) tagged with the wavelengths of the reference light sources and provided with reversely inclined portions are applied by the third sawtooth generator circuit 22. As a result, frequency shifts of −f1, −f2, . . . , and −fn are applied to the local light, corresponding to the wavelengths of the reference light sources.

Figure 10:
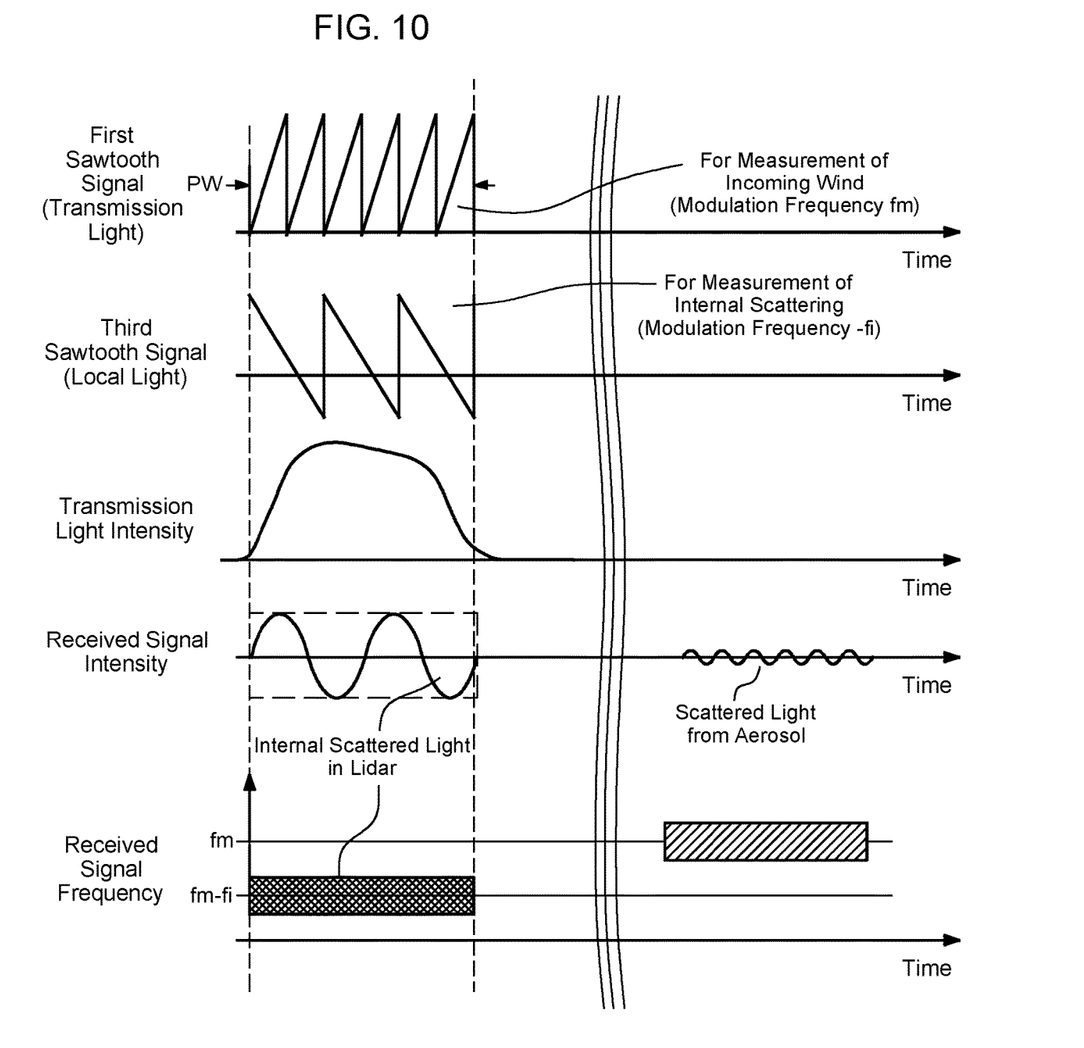
FIG. 10 is a configuration diagram showing an example configuration of a laser radar device according to the third embodiment of the present invention.

FIG. 10 illustrates a schematic of a modulation signal according to the third embodiment of the present invention.

The sawtooth signal input to the optical phase modulator 21 has inversely inclined portions with respect to the sawtooth signal input to the optical phase modulator 5. Therefore, the frequency shifts (frequency shifts for wavelength discrimination) to be applied to local light by the optical phase modulator 21 have the opposite signs to the frequency shifts (frequency shifts for modulation) to be applied to transmission light by the optical phase modulator 5. Thus, the modulation frequencies of the light obtained by combining the local light and the internal scattered light are fm-fi.

Figure 11:
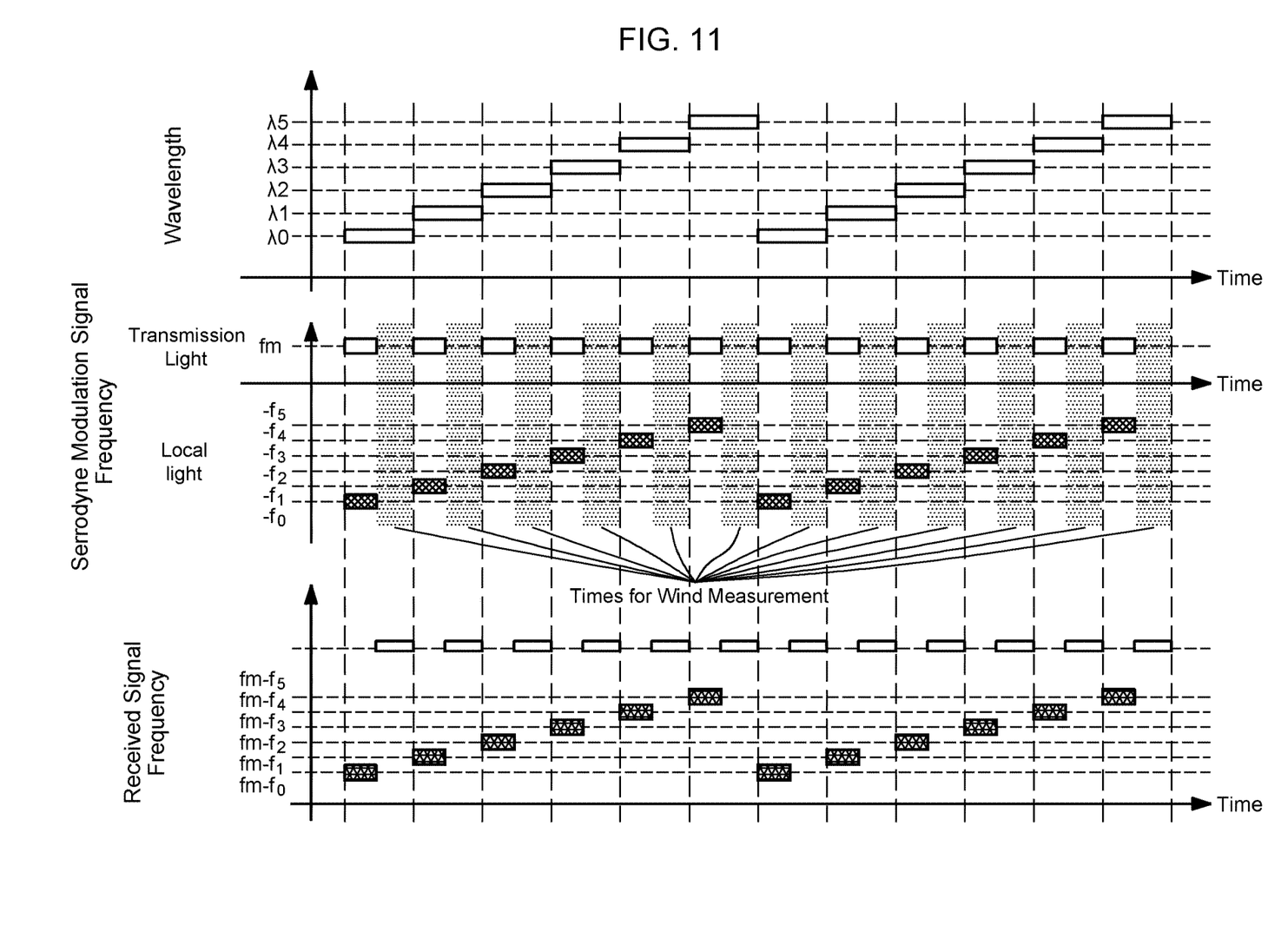
FIG. 11 is a schematic illustration of the signals obtained when switching between lines of sight is performed by switching between wavelengths according to the third embodiment of the present invention.

FIG. 11 is a schematic illustration of the signals obtained when the switching between lines of sight is performed by the switching between wavelengths, according to the third embodiment of the present invention.

This laser radar device performs switching between the frequency shift amounts of local light corresponding to the lines of sight (wavelengths of the reference light sources), respectively, to thereby shift the received signal frequency of the entire internal scattered light in response to the lines of sight. As a result, the time width of a line-of-sight identification signal becomes the same as a reception gate width. Therefore, the frequency of the internal scattered light can be analyzed with higher processing accuracy than in a case where the time width of a line-of-sight identification signal is smaller than the reception gate width. Further, because constant frequency shifts are applied to the transmission light, both the rising and falling portions of pulses can be used in wind measurement.

As described above, according to the third embodiment, constant frequency shifts (frequency shifts for modulation) are applied to transmission light, and frequency shifts corresponding to the lines of sight (frequency shifts for wavelength discrimination) are applied to local light. Thus, both the rising and falling portions of pulses can be effectively used in wind measurement.

Although the first through third embodiments concern cases where an optical phase modulator is used, the optical phase modulator can be replaced with a technique having a function capable of applying different frequency shifts in a time-division manner. Such a technique can be implemented by an IQ modulator with four electrodes, a Mach-Zehnder modulator with two electrodes, and/or an optical frequency shifter, for example.

REFERENCE SIGNS LIST

1: Wavelength selector; 2: Wavelength-tunable light source; 2a: First reference light source; 2b: Second reference light source; 2n: N-th reference light source; 3: Wavelength multiplexing coupler; 4: Optical branch coupler; 5: Optical phase modulator; 6a: First sawtooth generator circuit; 6b: Second sawtooth generator circuit; 7: Adder circuit; 8: Time-division sawtooth generator circuit; 9: Pulse generator circuit; 10: Semiconductor optical amplifier; 11: Optical amplifier; 12: Polarization-maintaining optical circulator; 13: Wavelength separator; 14a: First optical antenna; 14b: Second optical antenna; 14n: N-th optical antenna; 15: Optical coupler; 16: Optical heterodyne receiver; 17: AD converter (ADC); 18: Memory; 19: Signal processor; 20: Optical terminator; 21: Optical phase modulator; and 22: Third sawtooth generator circuit.

The invention claimed is:

1. A laser radar device comprising:
   a wavelength-tunable light source configured to emit light with a plurality of different wavelengths;
   an optical branch coupler configured to divide the light emitted by the wavelength-tunable light source into local light and transmission light;
   an optical phase modulator configured to apply, to the transmission light, frequency shifts thereby to output modulated transmission light;
   a wavelength separator configured to perform switching between light paths for output, in response to a wavelength of the modulated transmission light;
   an optical antenna configured to emit into space the modulated transmission light output by the wavelength separator, and configured to receive, as received light, backward-scattered light generated from the modulated transmission light in space in which lines of sight corresponding to the respective wavelengths of the modulated transmission light are determined;

an optical heterodyne receiver configured to receive the local light and the received light, and configured to perform heterodyne detection; and a signal processor configured to perform frequency analysis of an output signal of the optical heterodyne receiver, wherein the optical phase modulator is configured to apply, to the transmission light in a time-division manner, frequency shifts for wavelength discrimination of different shift amounts corresponding to the different wavelengths of the light emitted by the wavelength-tunable light source, and frequency shifts for modulation in which the frequency shifts for modulation do not depend on the respective wavelengths of the transmission light.

2. The laser radar device according to claim 1, further comprising a semiconductor optical amplifier configured to convert the modulated transmission light into pulses, wherein the optical phase modulator is configured to apply the frequency shifts for wavelength discrimination to rising portions or falling portions of the pulses.

3. The laser radar device according to claim 1, further comprising an optical terminator configured to terminate a light path of the wavelength separator.

4. The laser radar device according to claim 3, wherein:

the wavelength-tunable light source is configured to sequentially emit light beams with the different wavelengths; and the signal processor is configured to perform frequency analysis of internal scattered light from the optical terminator thereby to verify a sequence of the light beams emitted by the wavelength-tunable light source.

5. A laser radar device comprising:

a wavelength-tunable light source configured to emit light with a plurality of different wavelengths;

an optical branch coupler configured to divide the light emitted by the wavelength-tunable light source into local light and transmission light;

a first optical phase modulator configured to apply, to the local light, frequency shifts for wavelength discrimination thereby to output modulated local light;

a second optical phase modulator configured to apply, to the transmission light, frequency shifts for modulation thereby to output modulated transmission light;

a wavelength separator configured to perform switching between light paths for output, in response to a wavelength of the modulated transmission light;

an optical antenna configured to emit into space the modulated transmission light output by the wavelength separator, and configured to receive, as received light, backward-scattered light generated from the modulated transmission light in space in which lines of sight corresponding to respective wavelengths of the modulated transmission light are determined;

an optical heterodyne receiver configured to receive the modulated local light and the received light, and configured to perform heterodyne detection; and a signal processor configured to perform frequency analysis of an output signal of the optical heterodyne receiver, wherein: the first optical phase modulator is configured to apply, to the local light, the frequency shifts for wavelength discrimination of different shift amounts corresponding to the different wavelengths of the light emitted by the wavelength-tunable light source; and the second optical phase modulator is configured to apply, to the transmission light, the frequency shifts for modulation which do not depend on the respective wavelengths of the transmission light.

6. The laser radar device according to claim 5, wherein the frequency shifts for wavelength discrimination have opposite signs relative to the frequency shifts for modulation.

7. The laser radar device according to claim 5, further comprising an optical terminator configured to terminate a light path of the wavelength separator.

8. The laser radar device according to claim 7, wherein:

the wavelength-tunable light source is configured to sequentially emit light beams with the different wavelengths; and the signal processor is configured to perform frequency analysis of internal scattered light from the optical terminator thereby to verify a sequence of the light beams emitted by the wavelength-tunable light source.

9. A laser radar device comprising:

a wavelength-tunable light source configured to emit light with a plurality of different wavelengths;

an optical branch coupler configured to divide the light emitted by the wavelength-tunable light source into local light and transmission light;

an optical phase modulator configured to apply, to the transmission light, frequency shifts for wavelength discrimination thereby to output modulated transmission light;

a wavelength separator configured to perform switching between light paths for output, in response to a wavelength of the modulated transmission light;

an optical antenna configured to emit into space the modulated transmission light output by the wavelength separator, and configured to receive, as received light, backward-scattered light generated from the modulated transmission light in space in which lines of sight corresponding to respective wavelengths of the modulated transmission light are determined;

an optical heterodyne receiver configured to receive the local light and the received light, and configured to perform heterodyne detection;

a signal processor configured to perform frequency analysis of an output signal of the optical heterodyne receiver; and an optical terminator configured to terminate a light path of the wavelength separator, wherein: the wavelength-tunable light source is configured to sequentially emit light beams with the different wavelengths;

the optical phase modulator is configured to apply, to the transmission light, the frequency shifts for wavelength discrimination of different shift amounts corresponding to the different wavelengths of the light emitted by the wavelength-tunable light source; and the signal processor is configured to perform frequency analysis of internal scattered light from the optical terminator thereby to verify a sequence of the light beams emitted by the wavelength-tunable light source.

10. A laser radar device comprising:

a wavelength-tunable light source configured to emit light with a plurality of different wavelengths;

an optical branch coupler configured to divide the light emitted by the wavelength-tunable light source into local light and transmission light;

a first optical phase modulator configured to apply, to the local light, frequency shifts for wavelength discrimination thereby to output modulated local light;

a second optical phase modulator configured to apply, to the transmission light, frequency shifts for modulation thereby to output modulated transmission light;

a wavelength separator configured to perform switching between light paths for output, in response to a wavelength of the modulated transmission light;

an optical antenna configured to emit into space the modulated transmission light output by the wavelength separator, and configured to receive, as received light, backward-scattered light generated from the modulated transmission light in space in which lines of sight corresponding to respective wavelengths of the modulated transmission light are determined;

an optical heterodyne receiver configured to receive the modulated local light and the received light, and configured to perform heterodyne detection;

a signal processor configured to perform frequency analysis of an output signal of the optical heterodyne receiver; and an optical terminator configured to terminate a light path of the wavelength separator, wherein: the wavelength-tunable light source is configured to sequentially emit light beams with the different wavelengths;

the first optical phase modulator is configured to apply, to the local light, the frequency shifts for wavelength discrimination of different shift amounts corresponding to the different wavelengths of the light emitted by the wavelength-tunable light source; and the signal processor is configured to perform frequency analysis of internal scattered light from the optical terminator thereby to verify a sequence of the light beams emitted by the wavelength-tunable light source.

* * * * *